United States Patent
Greiner

(10) Patent No.: US 11,561,302 B2
(45) Date of Patent: Jan. 24, 2023

(54) LASER SCANNER FOR A LIDAR SYSTEM AND METHOD FOR OPERATING A LASER SCANNER

(71) Applicant: Robert Bosch GmbH, Stuttgart (DE)

(72) Inventor: Alexander Greiner, Reichenbach (DE)

(73) Assignee: Robert Bosch GmbH, Stuttgart (DE)

( * ) Notice: Subject to any disclaimer, the term of this patent is extended or adjusted under 35 U.S.C. 154(b) by 494 days.

(21) Appl. No.: 16/611,995

(22) PCT Filed: May 4, 2018

(86) PCT No.: PCT/EP2018/061485
§ 371 (c)(1),
(2) Date: Jan. 13, 2020

(87) PCT Pub. No.: WO2018/206422
PCT Pub. Date: Nov. 15, 2018

(65) Prior Publication Data
US 2021/0325536 A1 Oct. 21, 2021

(30) Foreign Application Priority Data
May 11, 2017 (DE) .......................... 102017207947.9

(51) Int. Cl.
*G01S 17/10* (2020.01)
*G01S 7/481* (2006.01)

(52) U.S. Cl.
CPC ............ *G01S 17/10* (2013.01); *G01S 7/4814* (2013.01); *G01S 7/4816* (2013.01); *G01S 7/4817* (2013.01)

(58) Field of Classification Search
CPC ...... G01S 17/10; G01S 7/4814; G01S 7/4816; G01S 7/4817; G01S 7/4815; G01S 7/4863; G01S 17/42
See application file for complete search history.

(56) References Cited

U.S. PATENT DOCUMENTS

2021/0270939 A1* 9/2021 Sakurano .............. G01S 7/4865

FOREIGN PATENT DOCUMENTS

DE 102007004609 A1 8/2007
DE 202006005876 8/2007
(Continued)

OTHER PUBLICATIONS

International Search Report for PCT/EP2018/061485, dated Jul. 25, 2018.

*Primary Examiner* — Roy M Punnoose
(74) *Attorney, Agent, or Firm* — Norton Rose Fulbright US LLP; Gerard Messina

(57) ABSTRACT

A laser-scanner for a LIDAR system scanning in a scanning direction, having a laser-source to emit a plurality of individual light-beams into a plurality of angular-ranges which are situated next to one another transversely to the scanning-direction. A receiver-optics of the laser-scanner is configured to concentrate reflected portions of the emitted-light-beams on exposure-regions of a sensor-plane of the laser-scanner that are situated next to one another transversely to the scanning-direction. A plurality of sensor-pixels of the laser-scanner are situated next to one another in the sensor-plane transversely to the scanning-direction. The sensor pixels are situated at an offset vis-a-vis the exposure-regions transversely to the scanning-direction. A control-electronics of the laser-scanner is configured to actuate the laser-source so that a plurality of light-beams is emitted in a time-staggered manner such that no more than the reflected portion of one of the light-beams impinges upon a sensor-pixel at the same time.

13 Claims, 2 Drawing Sheets

(56) References Cited

FOREIGN PATENT DOCUMENTS

| | | | | |
|---|---|---|---|---|
| DE | 102008019615 A1 | 11/2009 | | |
| DE | 102015200224 | 7/2016 | | |
| DE | 102015200224 A1 * | 7/2016 | ........... | G01S 17/931 |
| EP | 1845334 | 10/2007 | | |
| EP | 2696216 | 2/2014 | | |
| EP | 3312628 | 4/2018 | | |
| JP | H07218632 A | 8/1995 | | |
| JP | H09287913 A | 11/1997 | | |
| JP | 2001091210 A | 4/2001 | | |
| JP | 2002008709 A | 1/2002 | | |
| JP | 2016176721 A | 10/2016 | | |
| WO | WO-2016110442 A1 * | 7/2016 | ........... | G01S 7/4817 |
| WO | 2017/018152 | 2/2017 | | |

* cited by examiner

LASER SCANNER FOR A LIDAR SYSTEM AND METHOD FOR OPERATING A LASER SCANNER

FIELD OF THE INVENTION

The present invention relates to a laser scanner for a LIDAR system scanning in a scanning direction, and to a method for operating a laser scanner.

BACKGROUND INFORMATION

In a LIDAR system, laser beams are moved in a scanning direction. The laser beams are widened in the form of an individual fan transversely to the scanning direction. A laser beam thereby illuminates an angular range. Because of the scanning movement over time, the laser beam illuminates a strip that is as wide as the angular range. A receiver optics focuses light from the laser beams reflected by an object on a sensor. The light from an angular range is focused on a sensor pixel. A resolution of the LIDAR system transversely to the scanning direction is defined by the number of emitted laser beams.

SUMMARY OF THE INVENTION

Against this background, the approach presented here provides a laser scanner for a LIDAR system, a method for operating a laser scanner as well as a corresponding computer program product according to the descriptions herein. Advantageous further developments and improvements of the presented approach are further described herein.

Specific embodiments of the present invention may advantageously make it possible to increase the resolution of a laser scanner, and in particular to even double it, with an approximately unchanged investment in hardware.

A laser scanner for a LIDAR system scanning in a scanning direction is provided, the laser scanner having a laser source, which is configured to emit a plurality of individual light beams into a plurality of angular ranges that are situated next to one another transversely to the scanning direction; a receiver optics of the laser scanner being configured to concentrate reflected portions of the emitted light beams on exposure regions of a sensor plane of the laser scanner situated next to one another transversely to the scanning direction; a plurality of sensor pixels of the laser scanner being disposed next to one another in the sensor plane transversely to the scanning direction; the laser scanner being characterized in that the sensor pixels are disposed at an offset vis-a-vis the exposure regions transversely to the scanning direction; a control electronics of the laser scanner being configured to actuate the laser source in such a way that a plurality of light beams is emitted in a time-staggered manner such that no more than the reflected portion of one of the light beams impinges upon a sensor pixel at the same time.

In addition, a method for operating a laser scanner according to in the presented approach is introduced, which is characterized in that in a step of transmitting, the laser source is actuated to emit a light beam into one of the angular ranges at a transmission instant, the receiver optics guiding the reflected portions of the emitted light beam onto an exposure region allocated to the angular range, and in a step of receiving, a respective receiving instant when the reflected portions impinge upon the respective sensor pixel is read out from the two sensor pixels allocated to the exposure region.

Ideas in connection with specific embodiments of the present invention may be considered to be based, among other things, on the thoughts and recognitions described in the following text.

A LIDAR system may have a rotor which carries the laser scanner. The rotor may be rotatable about an axis of rotation which is aligned perpendicular to the scanning direction. The scanning direction may also be defined by a rotatable deflection mirror. For example, the scanning direction may be essentially horizontal. The axis of rotation may also be tilted under an angle with respect to the vertical. An angular range may be obliquely aligned under an angle of attack with respect to the axis of rotation. The angular ranges may have different angles of attack relative to the axis of rotation. For example, per angular range, a laser source may have a single switchable laser which is aligned under the angle of attack. In the same way, a movable deflection mirror is able to guide the light from an individual laser into the different angular ranges. The light emitted into the angular range is fanned out transversely to the scanning direction in order to scan a strip around the axis of rotation.

When the light impinges upon an object, it is dispersed and a portion of the light is reflected in the direction of the laser scanner. The receiver optics collects the reflected light using the largest possible receiving aperture and concentrates the light per angular range in an exposure region. A focused image of the angular range is able to be projected into the exposure region. In the same way, the light may be concentrated in the exposure region in an unfocused manner. The receiver optics may include lenses and/or mirrors for concentrating the light.

During the concentration process, light that is reflected by an object located at the edge of an angular range is concentrated on an edge of the associated exposure region. The exposure region is able to be detected in a spatially resolved manner in order to obtain a position of the object within the angular range. In the approach presented here, the spatial resolution is achieved by a detection of subregions of adjacent sensor pixels. In the process, light of the exposure region is partially detected by the one sensor pixel and partially by the adjacent sensor pixel in each case. In this way, a sensor pixel is partially covered by two adjacently located exposure regions. The sensor pixels may thus also be exposed to light from the respective adjacent exposure regions. A sensor may be a series sensor provided with sensor pixels that are arranged in a row next to one another. The sensor pixels may be shifted by half a sensor pixel or half an exposure region vis-a-vis the exposure regions. With the aid of a time-staggered actuation of the laser source, only light from one of the exposure regions always impinges upon a sensor pixel, so that a spatial allocation is taking place.

The present method may have a step of determining, in which a first distance value is determined based on the transmission instant and a receiving instant of the one sensor pixel. Based on the transmission instant and a receiving instant of the other sensor pixel, it is possible to determine a second distance value. The distance to two different objects, which are irradiated by the same laser, is able to be determined in this way.

The laser source may be actuated to emit a further light beam into a further angular range at a further transmission instant. The receiver optics is able to concentrate reflected portions of the further light beam on a further exposure region allocated to the further angular range. From two sensor pixels allocated to the further exposure region, a further receiving instant when the reflected portions impinge upon the respective sensor pixel is able to be read out. The further angular range may adjoin the first angular range. In this case, one of the further receiving instants may be read in from the same sensor pixel as previously the first receiving instant. Because of the time shift, the first receiving instant is able to be uniquely allocated to the first transmission instant, and thus to the first angular range, while the further receiving instant may be uniquely allocated to the further transmission instant, and thus to the adjacent angular range. Two objects are thereby able to be resolved by the same sensor pixel.

The light beams may be emitted in a sequential manner while the LIDAR system is scanning in the scanning direction. The receiving instants are able to be read out in sequence. The light beams are able to be emitted in a predefined sequence while the sensor pixels are read out in a pairwise manner in the same sequence.

At least two light beams are able to be simultaneously emitted into different angular ranges. At least one angular range between the angular ranges may remain unexposed. Because of the gap between the light beams, only the light from one light beam falls on a sensor pixel in each case.

A sequence of consecutive steps of transmitting is able to be carried out. In a first step of transmitting at a sequence start, three angular ranges between two simultaneously emitted light beams remain unexposed in each case. In two following steps of transmitting the sequence, the light beams, shifted by one angular range, are able to be emitted into the same direction in each case. In a final step of transmitting at a sequence end, a single light beam which is shifted by one angular range may be emitted. The sequence and a special interconnection of the sensor pixels make it possible to save an evaluation electronics. Two sensor pixels, which are spaced apart from each other by an interposed sensor pixel, are evaluated by the same evaluation electronics unit in each case. Because of the gap of three angular ranges between the emitted light beams, light falls either on the one sensor pixel or on the other sensor pixel.

The steps of the sequence are able to be repeated. The sequence allows for a rapid readout of the sensor using a minimum amount of evaluation electronics.

Also advantageous is a computer program product or a computer program having program code, which is able to be stored on a machine-readable medium and is used to carry out, implement and/or actuate the steps of the afore-described method.

It should be pointed out that a few of the possible features and advantages of the present invention have been described herein with reference to different specific embodiments of the laser scanner or the present method. One skilled in the art realizes that the features may be suitably combined, adapted or exchanged in order to obtain further specific embodiments of the present invention.

In the following text, specific embodiments of the present invention are described with reference to the appended drawing, but neither the drawing nor the description should be considered as limiting the present invention.

The figures are merely schematic and not true to scale. Identical reference numerals in the figures denote identical or identically acting features.

DETAILED DESCRIPTION

Figure 1:
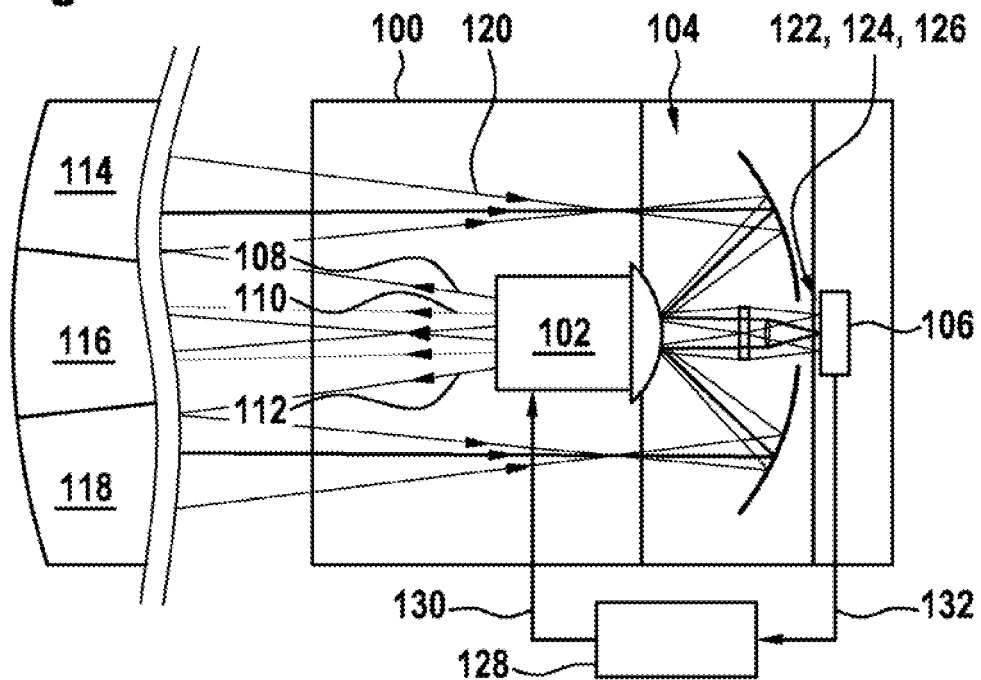
FIG. 1 shows a side view of a laser scanner according to an exemplary embodiment.

FIG. 1 shows a side view of a laser scanner 100 according to an exemplary embodiment. Laser scanner 100 has a laser source 102, a receiver optics 104 and a sensor 106. Laser scanner 100 is illustrated in simplified form here. Laser source 102 is configured to emit three fanned-out laser beams 108, 110, 112 into different angular ranges 114, 116, 118. In this case, first laser beam 108 is directed toward first angular range 114.

Second laser beam 110 is directed toward second angular range 116. Third laser beam 112 is directed toward third angular range 118.

When the light from one of laser beams 108, 110, 112 impinges upon an object, it will be dispersed. A portion of the dispersed light is reflected in the direction of laser scanner 100. Receiver optics 104 receives reflected light 120 and concentrates it on sensor 106 in exposure regions 122, 124, 126. In first exposure region 122, light 120 arrives from first angular range 114. In second exposure region 124, light 120 arrives from second angular range 116. In third exposure region 126, light 120 arrives from third angular range 118.

In this instance, receiver optics 104 is a mirror optics in combination with optical lenses. A spherical concave mirror concentrates reflected light 120 on a centrally situated convex mirror. From the convex mirror, reflected light 120 travels through a central opening in the spherical concave mirror and a lens system to sensor 106. Here, laser source 102 is situated on a rear side of the convex mirror and thus is coaxially aligned with respect to sensor 106.

Sensor 106 is a line sensor in this instance and has four sensor pixels which are situated in a row next to one another. The sensor pixels have the same size as exposure regions 122, 124, 126. The sensor pixels are shifted by half a pixel or half an exposure region 122, 124, 126 vis-a-vis exposure regions 122, 124, 126, so that an exposure region 122, 124, 126 is always detected by two sensor pixels.

A control electronics 128 of laser scanner 100 is connected to sensor 106 and laser source 102. Control electronics 128 controls laser source 102 via control signals 130. In the process, laser source 102 is actuated in such a way that only the light of one laser beam 108, 110, 112 always falls on a sensor pixel of sensor 106. Control electronics 128 also reads out sensor 106. Receiving instants 132 at which light 120 is registered on the respective sensor pixel are read out in the process.

Since a transmission instant of respective laser beam 108, 110, 112 is known, it is possible to determine the distance between laser scanner 100 and a reflection point of light 120 with the aid of the light speed and a receiving instant 132.

In other words, FIG. 1 shows a laser scanner 100 for a LIDAR system in which a transmitter unit 102 of laser scanner 100 is configured to emit n laser beams 108, 110, 112 into a detection range of laser scanner 100 in the form of a beam fan, which is fanned out in a direction of the fan; a receiver unit 106 of laser scanner 100 has n+1 sensor pixels, which are situated next to one another in the fan direction; and a receiver optics 104 of laser scanner 100 is configured to focus images 122, 124, 126 of impingement surfaces of laser beams 108, 110, 112 on a respective transition between two of the sensor pixels.

In this instance, receiver optics 104 is exemplarily configured to include a mirror system. Transmitter optics 102 is made up of n vertical planes or transmitter units. Receiver optics 104 images returning light 120 onto the detector plane. Detector 106 is made up of n+1 parts or pixels, all of which are able to be individually evaluated.

Figure 2:
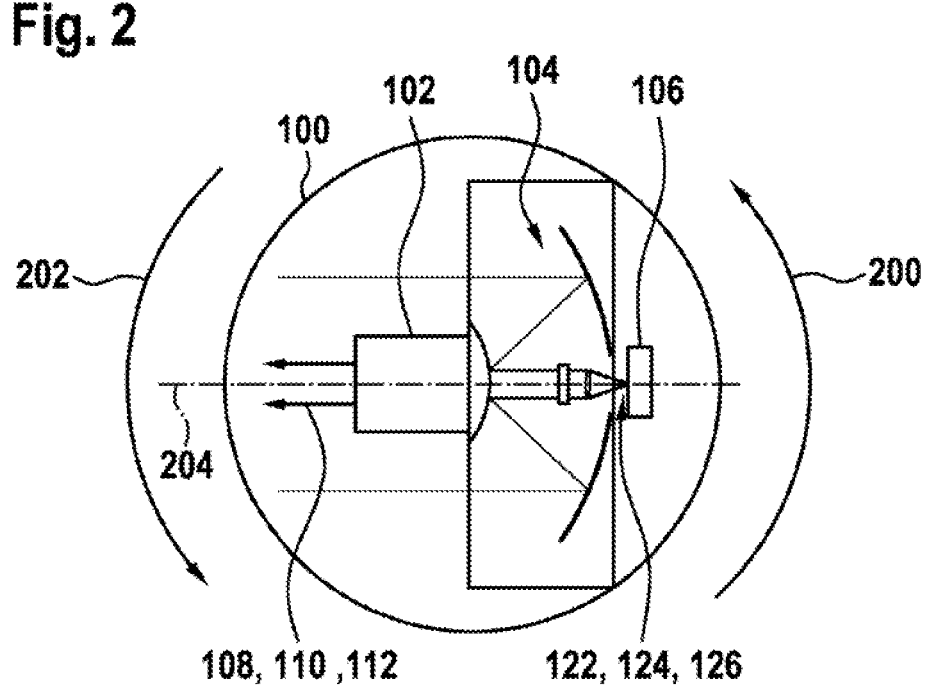
FIG. 2 shows a plan view of a laser scanner according to an exemplary embodiment.

FIG. 2 shows a plan view of a laser scanner 100 according to an exemplary embodiment. Laser scanner 100 essentially corresponds to the laser scanner in FIG. 1. Here, a rotary motion 200 of the laser scanner is illustrated. Entire laser scanner 100 is rotated about an axis of rotation. Laser beams 108, 110, 112 move in a scanning direction 202 because of rotary motion 200. Laser beams 108, 110, 112 are fanned out transversely to scanning direction 202. In this instance, the system of laser source 102, receiver optics 104 and sensor 106 is rotationally symmetrical with respect to an optical axis 204 of receiver optics 104.

In introduced laser scanner 100, a method for operating according to an exemplary embodiment is able to be executed. The method has a step of transmitting, a step of reading out and a step of determining.

In the step of transmitting, a first laser beam 108 is emitted into a detection range of laser scanner 100 at a first transmission instant. At a following, second transmission instant, a second laser beam 110, which points in a different direction to laser beam 108, is emitted into the detection range.

In the step of reading out, following the first transmission instant, a first response instant of a first sensor pixel and a second response instant of an adjacent, second sensor pixel to a first image 122, focused on a first transition between the first sensor pixel and the second sensor pixel, of a first impingement surface illuminated by first laser beam 108 are read out. Following the second transmission instant, a third response instant of the second sensor pixel and a fourth response instant of an adjacent, third sensor pixel to a second image 124, focused on a second transition between the second sensor pixel and the third sensor pixel, of a second impingement surface illuminated by the second laser beam 110 are read out.

In the step of determining, a first distance value to a first subregion of the first impingement surface is determined based on the first transmission instant and the first response instant, and a second distance value to a second subregion of the first impingement surface is determined based on the first transmission instant and the second response instant. A third distance value to a third subregion of the second impingement surface is determined using the second transmission instant and the third response instant. A fourth distance value to a fourth subregion of the second impingement surface is determined using the second transmission instant and the fourth response instant.

Figure 3:
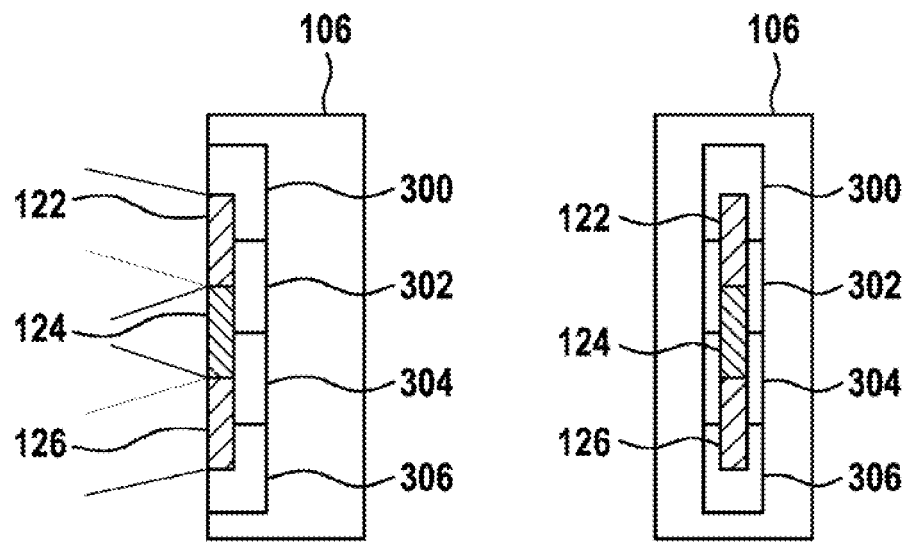
FIG. 3 shows illustrations of offset exposure regions on a sensor of a laser scanner according to an exemplary specific embodiment.

FIG. 3 shows illustrations of offset exposure regions 122, 124, 126 on a sensor 106 of a laser scanner according to an exemplary embodiment. Sensor 106 essentially corresponds to the sensor in FIGS. 1 and 2. Here, too, sensor 106 is shown in greatly simplified form with only four sensor pixels 300, 302, 304, 306. Sensor pixels 300, 302, 304, 306 are disposed in a row directly next to one another.

Each exposure region 122, 124, 126 is as wide as a pixel. Sensor pixels 300, 302, 304, 306 are offset by half a pixel width vis-a-vis exposure regions 122, 124, 126. The center of an exposure region lies on a transition between an upper sensor pixel and a lower sensor pixel. As a result, the light from an upper half of an exposure region falls onto a lower region of the upper sensor pixel. The light from a lower half of the exposure region falls onto an upper half of the lower sensor pixel.

In order to avoid a double exposure of one of pixels 300, 302, 304, 306, the laser source simultaneously illuminates no more than every second angular range. The angular ranges situated in-between remain unexposed and will be exposed subsequently. In other words, FIG. 3 shows the use of an interlace technique for simplifying the transmitter and receiver units of a LIDAR system.

LIDAR sensors are able to be used for the realization of highly automated driving functions. Mechanical laser scanners may be used for covering large horizontal detection angles that range from 150° to 360°. In the case of a rotary mirror laser scanner, a motor-driven deflection mirror is rotating. This restricts a maximum detection range to approximately 150°. In the case of laser scanners having larger detection ranges of up to 360°, all electro-optical components are situated on a motor-driven rotary plate or rotor.

LIDAR systems may be configured as single-lens systems. In a single-lens system, an avalanche photodiode (APD) is typically provided for each laser for the vertical resolution. Thus, 16 lasers, which are imaged on 16 avalanche photodiodes (APDs), are required for a system of this kind having 16 vertical planes.

In the approach presented here, the number of planes in a LIDAR sensor is able to be increased at a minimal effort. Through a suitable selection of n lasers having n+1 detectors 300, 302, 304, 306, a system having 2×n planes is able to be realized. Moreover, an evaluation electronics is able to be saved by an additional interconnection of detectors 300, 302, 304, 306.

In other words, a suitable selection of the number of lasers in conjunction with a suitable number of detectors 300, 302, 304, 306 make it easily possible to increase the resolution.

A large number of electronic components is able to be saved by the approach presented here. An additional differentiation of light 122, 124, 126 from different lasers impinging upon a detector 300, 302, 304, 306 is required. This may be achieved either by an actuation of the lasers at separate points in time or through the use of some other suitable measure. In this way, an uncomplicated doubling of the resolution, an omission of an evaluation electronics, a cost-effective realization of a vertical resolution specification and savings in terms of electronic components are able to be achieved.

This is illustrated in FIG. 3 for an n=3 system. If the transmitter units in the illustrated case, where n=3, are activated at different times, then such a system makes it possible to increase the resolution to six planes. To ensure that the whole sequence does not take up too much time, the first and the third transmitter units are able to be activated at the same time, and the second transmitter unit may then be activated subsequently.

Figure 4:
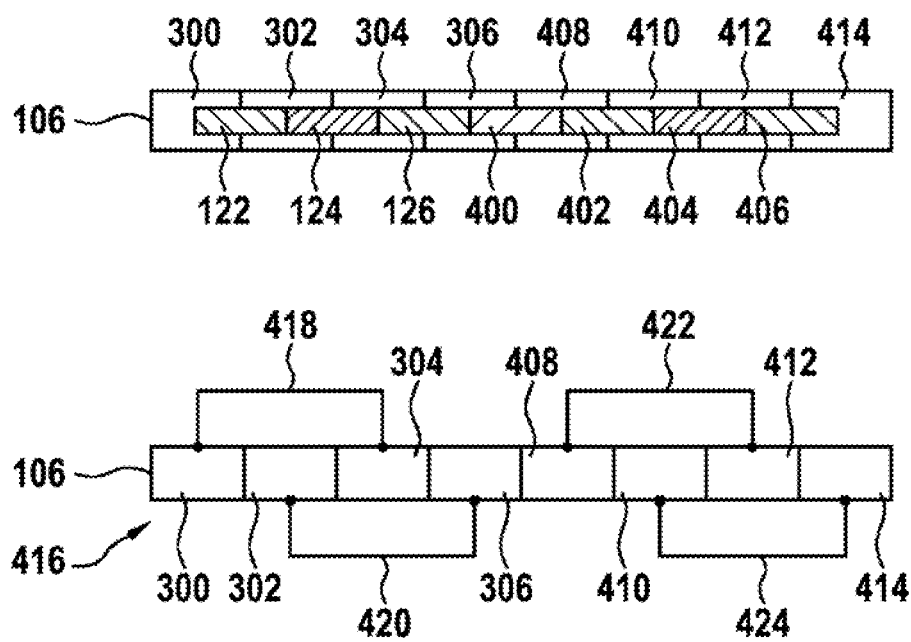
FIG. 4 shows illustrations of offset exposure regions on a sensor of a laser scanner and an interconnection for the evaluation of the sensor of a laser scanner according to an exemplary embodiment.

FIG. 4 shows illustrations of offset exposure regions 122, 124, 126, 400, 402, 404, 406 on a sensor 106 of a laser scanner as well as an interconnection for the evaluation of sensor 106 of a laser scanner according to an exemplary embodiment. Sensor 106 essentially corresponds to the sensor in FIG. 3. In contrast thereto, sensor 106 has eight sensor pixels 300, 302, 304, 306, 408, 410, 412, 414 in this instance. As in FIG. 3, sensor pixels 300, 302, 304, 306, 408, 410, 412, 414 are situated at an offset of one half of their widths vis-a-vis exposure regions 122, 124, 126, 400, 402, 404, 406. In this way each exposure region 122, 124, 126, 400, 402, 404, 406 is able to be resolved by two subregions allocated to two adjacent sensor pixels 300, 302, 304, 306, 408, 410, 412, 414 in each case.

In one exemplary embodiment, sensor 106 is read out with the aid of a simple evaluation circuit 416. Two of sensor pixels 300, 302, 304, 306, 408, 410, 412, 414 in each case are jointly connected to an evaluation unit. As a result, entire sensor 106 is able to be read out using only four evaluation units 418, 420, 422, 424. First sensor pixel 300 and third sensor pixel 304 are read out by first evaluation unit 418. Second sensor pixel 302 and fourth sensor pixel 306 are read out by second evaluation unit 420. Fifth sensor pixel 408 and seventh sensor pixel 412 are read out by third evaluation unit 422. Sixth sensor pixel 410 and eighth sensor pixel 414 are read out by fourth evaluation unit 424.

Evaluation units 418, 420, 422, 424 are able to evaluate only one sensor pixel 300, 302, 304, 306, 408, 410, 412, 414 at the same time. As a result, exposure regions 122, 124, 126, 402, 404, 406 are simultaneously exposed in sequence and in a pairwise manner, except for fourth exposure region 400, with the result that four of sensor pixels 300, 302, 304, 306, 408, 410, 412, 414 in each case are partially exposed at the same time. Fourth exposure region 400 is individually exposed, and fourth and fifth sensor pixels 306, 408 are read out by second and fourth evaluation unit 420, 422. The sequence then starts anew from the beginning.

In other words, the first laser and the fifth laser are active in a first time slot and light in first exposure region 122 is able to be received by first sensor pixel 300 and second sensor pixel 302, as well as in fifth exposure region 402 by fifth sensor pixel 408 and sixth sensor pixel 410. First sensor pixel 300 is evaluated by first evaluation unit 418. Second sensor pixel 302 is evaluated by second evaluation unit 420. Fifth sensor pixel 408 is evaluated by third evaluation unit 422. Sixth sensor pixel 410 is evaluated by fourth evaluation unit 424.

In a second time slot, the second laser and the sixth laser are active. Light in second exposure region 124 is able to be received 124 by second sensor pixel 302 and third sensor pixel 304. In sixth exposure region 404, light is able to be received by sixth sensor pixel 410 and seventh sensor pixel 412. Second sensor pixel 302 is evaluated by second evaluation unit 420. Third sensor pixel 304 is evaluated by first evaluation unit 418. Sixth sensor pixel 410 is evaluated by fourth evaluation unit 424. The seventh sensor pixel is evaluated by third evaluation unit 422.

In a third time slot, the third laser and the seventh laser are active. Light in third exposure region 126 is able to be received by third sensor pixel 304 and fourth sensor pixel 306. In the seventh exposure region, light is able to be received by seventh sensor pixel 412 and eighth sensor pixel 414. Third sensor pixel 304 is evaluated by first evaluation unit 418. Fourth sensor pixel 306 is evaluated by second evaluation unit 420. The seventh sensor pixel is evaluated by third evaluation unit 422. Eighth sensor pixel 414 is evaluated by fourth evaluation unit 424.

In a fourth time slot, the fourth laser is active. In fourth exposure region 400, light is able to be received by fourth sensor pixel 306 and fifth sensor pixel 408. Fourth sensor pixel 306 is evaluated by second evaluation unit 420. Fifth sensor pixel 408 is evaluated by third evaluation unit 422.

A simplification of the evaluation electronics of such a system is able to be achieved through suitable coupling of detector units 300, 302, 304, 306, 408, 410, 412, 414. This is illustrated by way of example for a system having n=7 transmitter units. The illustrated system has a resolution of 2×n=14 planes.

In conclusion it should be pointed out that terms such as 'having', 'including' etc. do not exclude other elements or steps and that terms such as 'a' do not exclude a plurality. Reference numerals in the claims are not to be considered a restriction.

What is claimed is:

1. A laser scanner for a LIDAR system scanning in a scanning direction, comprising:
   a laser source to emit a plurality of individual light beams into a plurality of angular ranges that are situated next to one another transversely to the scanning direction;
   a receiver optics apparatus to concentrate reflected portions of the emitted light beams on exposure regions of a sensor plane of the laser scanner situated next to one another transversely to the scanning direction; and
   a plurality of sensor pixels disposed next to one another in the sensor plane transversely to the scanning direction, wherein the sensor pixels are disposed at an offset relative to the exposure regions transversely to the scanning direction so that each of the sensor pixels receives reflected light beams concentrated on two different ones of the exposure regions; and
   a control electronics apparatus to actuate the laser source so that a plurality of light beams is emitted in a time-staggered manner such that no more than the reflected portion of one of the light beams impinges upon a sensor pixel at a time, and at a respective receiving instant for each exposure region, read out from two sensor pixels allocated to the exposure region.

2. The laser scanner of claim 1, wherein the control electronics actuates the laser source so that at least two of the light beams are simultaneously emitted into different angular ranges, and at least one angular range between the two different angular ranges remains unexposed.

3. A method for operating a laser scanner for a LIDAR system, the method comprising:
   emitting, via a laser source which is actuated, a light beam into one of a plurality of angular ranges at a transmission instant;
   guiding, via receiver optics, reflected portions of the emitted light beam onto an exposure region allocated to the one of the angular ranges, the exposure region being one of a plurality of exposure regions of a sensor plane situated next to one another transversely to a scanning direction; and
   at a respective receiving instant reading out from two sensor pixels allocated to the exposure region, wherein the two sensor pixels are of a plurality of sensor pixels disposed next to one another in the sensor plane transversely to the scanning direction.

4. The method of claim 3, further comprising:
   determining a first distance value based on the transmission instant and a receiving instant of the one of the sensor pixels, and a second distance value based on the transmission instant and a receiving instant of the another one of the sensor pixels.

5. The method of claim 3, wherein in the transmitting, the laser source is actuated to emit a further light beam into a further angular range at a further transmission instant, wherein the receiver optics concentrates reflected portions of the further light beam on a further exposure region allocated to the further angular range, and wherein in the receiving, a respective receiving instant when the reflected portions impinge upon the respective sensor pixel is read out from two sensor pixels allocated to the further exposure region.

6. The method of claim 5, wherein in the transmitting, the light beams are emitted in a sequential manner while the LIDAR system is scanning in the scanning direction, and wherein in the receiving, the receiving instants are read out in sequence.

7. The method of claim 3, wherein in the transmitting, at least two light beams are simultaneously emitted into different angular ranges, and wherein at least one angular range between the angular ranges remains unexposed.

8. The method of claim 7, wherein a sequence of consecutive tasks of transmitting is performed, and in a first task of transmitting at a sequence start, three angular ranges between two simultaneously emitted light beams remain unexposed in each case, and wherein in two following tasks of transmitting the sequence, the light beams are emitted shifted by one angular range into the same direction in each case, and wherein in a final task of transmitting at a sequence end, a single light beam that is shifted by one angular range is emitted.

9. The method of claim 8, wherein the performing of the sequence is repeated.

10. The method of claim 3, wherein at least two light beams are simultaneously emitted into different angular ranges, and at least one angular range between the two different angular ranges remains unexposed.

11. A non-transitory computer readable medium having a computer program instructions, which when executed by a processor performs a method of operating a laser scanner for a LIDAR system, the method comprising:

emitting, via a laser source which is actuated, a light beam into one of a plurality of angular ranges at a transmission instant;

guiding, via receiver optics, reflected portions of the emitted light beam onto an exposure region allocated to the one of the angular ranges, the exposure region being one of plurality of exposure regions of a sensor plane situated next to one another transversely to a scanning direction; and at a respective receiving instant reading out from two sensor pixels allocated to the exposure region, wherein the two sensor pixels are of a plurality of sensor pixels disposed next to one another in the sensor plane transversely to the scanning direction.

12. The computer readable medium of claim 11, further comprising:

determining a first distance value based on the transmission instant and a receiving instant of the one of the sensor pixels, and a second distance value based on the transmission instant and a receiving instant of the another one of the sensor pixels.

13. The non transitory computer readable medium of claim 11, wherein at least two light beams are simultaneously emitted into different angular ranges, and at least one angular range between the two different angular ranges remains unexposed.

* * * * *